US007088256B2

(12) United States Patent
Opela et al.

(10) Patent No.: US 7,088,256 B2
(45) Date of Patent: Aug. 8, 2006

(54) PORTABLE ELECTRONIC DEVICE AND METHOD OF OPERATION THEREFORE

(75) Inventors: Peter S. Opela, Lake Worth, FL (US); Thomas J. Rollins, Boynton Beach, FL (US); Yun Yee Wong, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 79 days.

(21) Appl. No.: 10/903,541

(22) Filed: Jul. 30, 2004

(65) Prior Publication Data

US 2006/0022807 A1 Feb. 2, 2006

(51) Int. Cl.
*G08B 21/00* (2006.01)

(52) U.S. Cl. .......................... 340/636.15; 340/636.12; 340/407.1

(58) Field of Classification Search ............ 340/407.1, 340/384.6, 384.7, 393.2, 636.1, 636.12, 636.15, 340/636.16; 368/203, 204; 606/34, 38; 359/152, 172; 310/316.01; 331/4; 604/22; 713/300, 320, 322

See application file for complete search history.

(56) References Cited

U.S. PATENT DOCUMENTS

| | | | | |
|---|---|---|---|---|
| 4,441,098 | A * | 4/1984 | Borras et al. | 341/20 |
| 4,965,532 | A * | 10/1990 | Sakurai | 331/4 |
| 5,406,272 | A * | 4/1995 | Jang | 340/7.37 |
| 5,425,704 | A * | 6/1995 | Sakurai et al. | 604/22 |
| 5,792,138 | A * | 8/1998 | Shipp | 606/38 |
| 6,104,512 | A * | 8/2000 | Batey et al. | 398/120 |
| 6,424,600 | B1 * | 7/2002 | Okeya et al. | 368/204 |
| 6,744,698 | B1 * | 6/2004 | Koyama et al. | 368/204 |
| 6,785,829 | B1 * | 8/2004 | George et al. | 713/320 |

* cited by examiner

*Primary Examiner*—Van T. Trieu
(74) *Attorney, Agent, or Firm*—Raindi L. Karpinia; Douglas S. Rupert

(57) ABSTRACT

A portable electronic device (100) comprises an attached device (190,195), a vibrator (175), and a processor (105) coupled between the attached device (190, 195) and the vibrator (175). The processor (105) is adapted to detect the attached device (190, 195), determine an identification for the attached device (190,195), associate a drive voltage with the identification, and drive the vibrator (175) using the drive voltage.

12 Claims, 2 Drawing Sheets

195 ONE OR MORE ACCESSORIES
140 ACCESSORY INTERFACE
145
105 PROCESSOR
VIBRATION CONTROL MANAGER
160
165 POWER MANAGEMENT
170
190 ONE OR MORE BATTERIES
150 BATTERY INTERFACE
180
175
VIBRATION GENERATOR
155
110
185 WEIGHT
VIBRATOR
120 MEMORY
130
135
125

| IDENTIFICATION | DRIVE VOLTAGE |
|---|---|
| BATTERY A | V1 |
| BATTERY B | V2 |
| ⋮ | ⋮ |
| BATTERY N | V3 |
| ACCESSORY A | V4 |
| ACCESSORY B | V5 |
| ⋮ | ⋮ |
| ACCESSORY N | V6 |

100

PORTABLE ELECTRONIC DEVICE AND METHOD OF OPERATION THEREFORE

BACKGROUND OF THE INVENTION

1. Field of the Invention

This invention relates generally to the field of portable electronic devices capable of generating vibratory alerts.

2. Description of the Related Art

Many portable electronic devices utilize a tactile alert (i.e. vibratory alert) to alert the user of alarms, errors, or incoming data, messages, or calls. The vibrator, upon activation, generates vibrations which are transferred to the portable electronic device housing causing the device housing to shake, thereby alerting the user.

Typically, a vibrator mechanism is an electromagnetic or piezo electric driven rotary or linear device with an off set weight to generate a vibratory sensory pulse. When the portable electronic device is positioned against the user's body, such as by placement in a shirt pocket or hung from a belt, the vibration alerts the user without others hearing the alert. This silent alert is particularly advantageous in meetings, in libraries, in offices where a lot of people share common space and other places where it may be inappropriate to use an audio alert.

Some portable electronic devices today have interchangeable battery packs that allow the end user to trade up to a thicker/heavier device for more battery life (or visa versa). One drawback to this battery pack flexibility is that since the vibrator motor strength (normally proportional to vibrator motor speed) is optimized to one particular battery pack (with its own specific mass), suboptimal vibration performance is observed when thicker (and/or heavier) battery packs are installed.

BRIEF DESCRIPTION OF THE DRAWINGS

The accompanying figures, where like reference numerals refer to identical or functionally similar elements throughout the separate views and which together with the detailed description below, are incorporated in and form part of the specification, serve to further illustrate various embodiments and to explain various principles and advantages all in accordance with the present invention.

DETAILED DESCRIPTION

The present invention provides a method and apparatus within a portable electronic device for automatically adjusting vibration strength based on the detection of mass lost or gained when an accessory device (such as a battery or dongle) is attached or removed. It uses identification (ID) data to auto-adjust vibration strength.

Figure 1:
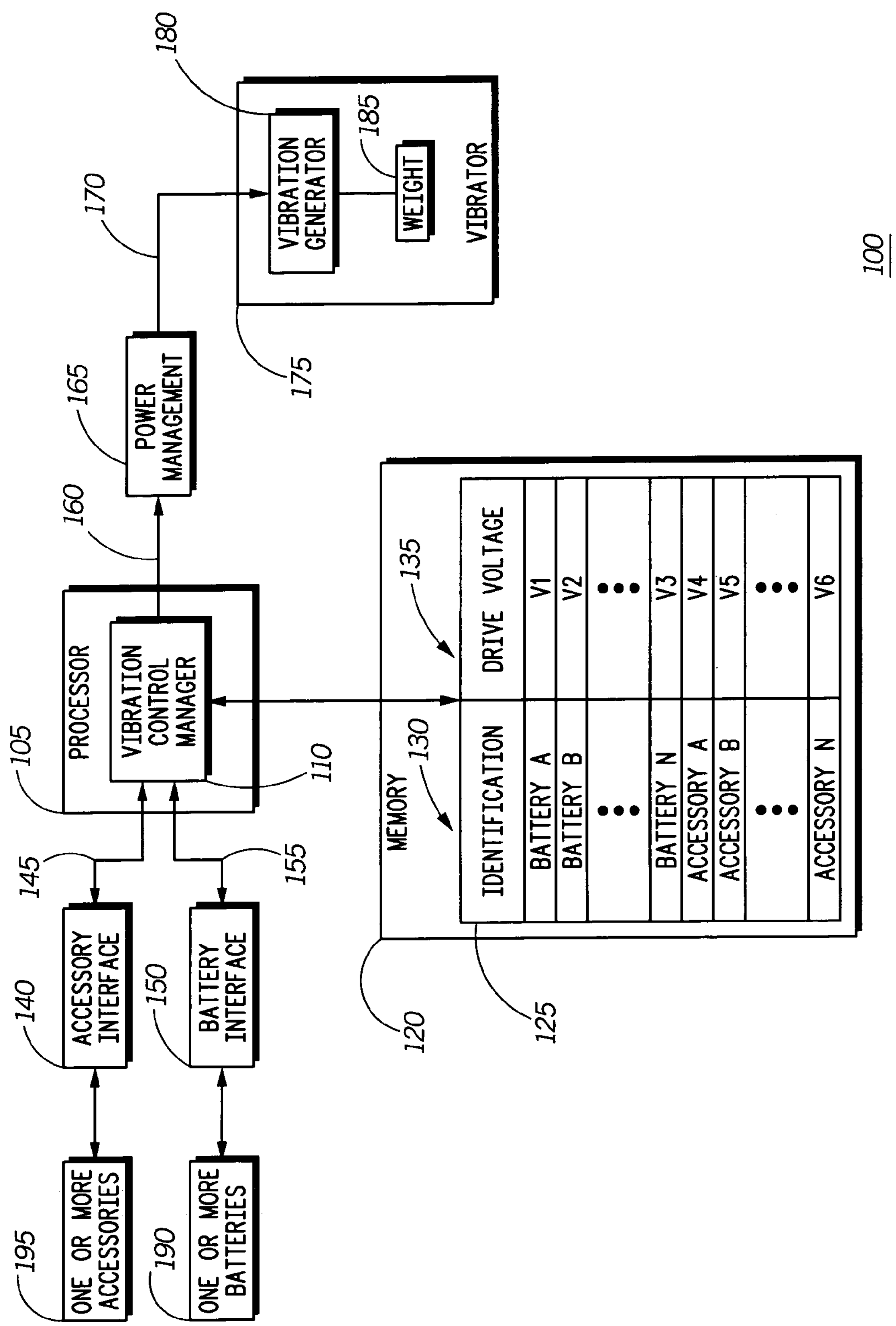
FIG. 1 is an electronic block diagram of a portable electronic device.

FIG. 1 is an electronic block diagram of a portable electronic device 100. The portable electronic device 100, for example, can be a mobile cellular telephone, a mobile radio data terminal, a mobile cellular telephone having an attached data terminal, a personal computer, a personal digital assistant, or a two way messaging device. In the following description, the term "portable electronic device" refers to any of the devices mentioned above or an equivalent.

As illustrated in FIG. 1, the portable electronic device 100 includes a processor 105, a memory 120, and a vibrator 175.

To perform the necessary functions of the portable electronic device 100, the processor 105 is coupled to the memory 120, which can include a random access memory (RAM), a read-only memory (ROM), and an electrically erasable programmable read-only memory (EEPROM)(not shown). It will be appreciated by those of ordinary skill in the art that the memory 120 can be integrated within the portable electronic device 100, or alternatively can be at least partially contained within an external memory such as a subscriber identification module (SIM) card mechanically interconnected to the portable electronic device 100. A SIM card is an electronic device typically including a microprocessor unit and a memory suitable for encapsulating within a small flexible plastic card. The SIM card additionally includes some form of interface for communicating with an external device or system. The SIM card can be used to transfer a variety of information from/to the portable electronic device 100 and/or any other compatible device.

In accordance with the present invention, a drive voltage memory 125 is stored with the memory 120. As described previously herein, the drive voltage memory 125 can be stored within an internal memory, an external memory, or a combination therein. The drive voltage memory 125 preferably stores a plurality of predetermined drive voltages 135 associated a plurality of identifications 130. For example, as illustrated in FIG. 1, a Battery A identification has a drive voltage V1 associated and stored therewith. Similarly, an Accessory A identification has a drive voltage V4 associated and stored therewith.

The processor 105 includes a vibration control manager 110. Alternatively, the vibration control manager 110 can be external to and electronically coupled to the processor 105. The vibration control manager 110 can be hard coded or programmed into the portable electronic device 100 during manufacturing, can be programmed over-the-air upon customer subscription, or can be a downloadable application. It will be appreciated that other programming methods can be utilized for programming the vibration control manager 110 into the portable electronic device 100. It will be further appreciated by one of ordinary skill in the art that the vibration control manager 110 can be hardware circuitry within the portable electronic device 100 including being integrated within the processor 105.

The vibration control manager 110 operates using a plurality of rules which can be manually set by the user of the portable electronic device 100, can be preprogrammed into the portable electronic device 100, or can be programmed into the portable electronic device 100 by an administrator. Preferably, the plurality of rules can be changed as desired by the user and/or administrator. The plurality of rules, for example, can include identifying a vibrator drive voltage associated with a detected accessory or battery identification using the data stored in the drive voltage memory 125.

A battery interface 155 is preferably coupled to the vibration control manager 110. The battery interface 155 provides mechanical and electrical coupling of a battery 190 to the portable electronic device 100. Upon detection of a connected battery 190, the battery interface 150 provides a battery signal 155 to the vibration control manager 110. In one embodiment, the battery signal 155 comprises a battery identification. Upon receipt of the battery signal 155, the vibration control manager 110 can retrieve the associated drive voltage for the battery identification from the drive voltage memory 125. Alternatively, the battery signal 155 can include the drive voltage directly or some other associated battery information. In an alternative embodiment, the vibration control manager 110 can query the connected battery 190 via the battery interface 150 to determine the battery identification and/or other battery parameters. For example, the vibration control manager 110 can identify the type of battery by reading an EPROM table which is embedded in the battery 190. Other methods such as mechanical keying or resister coding can also be used to identify the battery identification.

An accessory interface 140 is preferably coupled to the vibration control manager 110. The accessory interface 140 provides mechanical and electrical coupling of one or more accessories to the portable electronic device 100. Upon detection of a connected accessory 195, the accessory interface 140 provides an accessory signal 145 to the vibration control manager 110. In one embodiment, the accessory signal 145 comprises an accessory identification. Upon receipt of the accessory signal 145, the vibration control manager 110 can retrieve the associated drive voltage for the accessory identification from the drive voltage memory 125. Alternatively, the accessory signal 145 can include the drive voltage directly or some other associated accessory information. In an alternative embodiment, the vibration control manager 110 can query the connected accessory 195 via the accessory interface 140 to determine the accessory identification and/or other accessory parameters. For example, the vibration control manager 110 can identify the type of accessory by accessing a memory embedded in the accessory 195. Other methods such as mechanical keying or resister coding can also be used to identify the accessory identification.

Using the various methods described previously herein, the vibration control manager 110 can either determine a required drive voltage directly from the accessory 195 and/or battery 190, by querying the drive voltage memory 125, or by a predetermined algorithmic method which relates battery identification to required vibrator drive voltage.

The vibration control manager 110 is further coupled to a power management block 165. Upon detection of a new drive voltage, the vibration control manager 110 sends a command 160 to the power management block 165 including the new drive voltage to be utilized. The power management block 165 is further coupled to the vibrator 175 which comprises a vibration generator 180 and a weight 185. It will be appreciated by those of ordinary skill in the art that the vibrator 175 can alternatively comprise any electromagnetic or piezo electric driven rotary or linear device with an offset weight to generate a vibratory sensory pulse. The power management block 165, in response to the command 160, generates and provides a drive voltage 170 to the vibrator 175. In this manner, the vibration control manager 110 is able to drive or cause the power management block 165 to operate the vibrator 175 at the correct voltage, thereby causing a tactile sensation which has been optimized to the new product mass resulting from the change in battery mass and/or accessory mass.

Upon receipt and processing of a message or a call, or upon expiration of a timer or alarm, the processor 105 preferably generates a command signal to the vibrator 175 as a notification that the message has been received and stored, that a call is waiting for a response, or that a timer or alarm has expired. The vibrator 175 thereafter responds by producing a physical vibration using the provided drive voltage 170 from the power management block 165.

Figure 2:
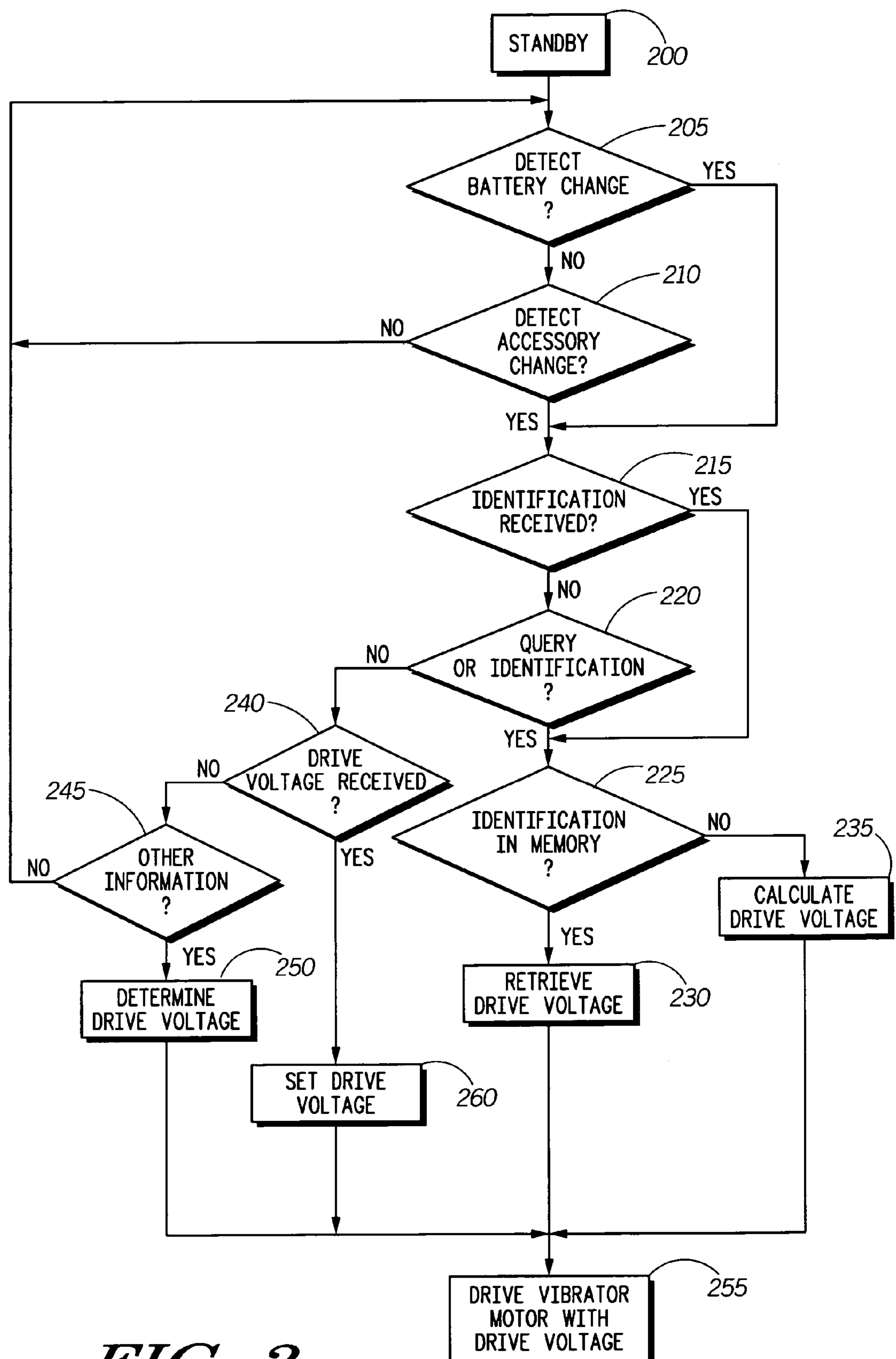
FIG. 2 is a flowchart illustrating one embodiment of the operation of the portable electronic device.

FIG. 2 is a flowchart illustrating one embodiment of the operation of the portable electronic device 100. Specifically, FIG. 2 illustrates the operation of the vibration control manager 110 in accordance with the present invention. As illustrated, the operation begins with Step 200 in which the portable electronic device 100 is in standby operation mode. Next, in Step 205, the vibration control manager 110 determines whether or not a battery change via the battery interface 150 has been detected. A battery change, for example, can be a removal of a battery, an attachment of a battery, or any combination therewith. When no battery change has been detected in Step 205, the operation continues with Step 210 in which the vibration control manager 110 determines whether or not an accessory change via the accessory interface 140 has been detected. An accessory change, for example, can be a removal of an accessory, an attachment of an accessory, or any combination therewith. When no accessory change is detected in Step 210, the operation cycles back to Step 205 and periodically checks for a battery change.

When a battery change is detected in Step 205 or an accessory change is detected in Step 210, the operation continues with Step 215 in which the vibration control manager 110 determines whether or not an identification has been received. The identification, for example, can be a battery identification received via the battery interface 150 or an accessory identification received via the accessory interface 140. When no identification has been received, the operation continues to Step 220 in which the vibration control manager 110 queries the new battery or the new accessory for the identification. When the query of Step 220 results in the new identification or the identification is received in Step 215, the operation continues to Step 225 in which the vibration control manager 110 determines whether the received identification is stored in the drive voltage memory 125. When the identification is stored in the drive voltage memory 125 in Step 225, the operation continues to Step 230 in which the associated drive voltage is retrieved from the drive voltage memory 125. When the identification is not stored in the drive voltage memory in Step 225, the operation continues to Step 235 in which the drive voltage is calculated using preprogrammed rules and/or algorithms in the vibration control manager 110.

Returning to Step 220, when no identification is available via query, the operation continues to Step 240 in which the vibration control manager 110 determines whether a drive voltage has been received. For example, the drive voltage for a changed battery can be received or alternatively obtained directly via the battery interface 150 from the attached battery. Similarly, the drive voltage for a changed accessory can be received or alternatively obtained directly via the accessory interface 140 from the attached accessory. When the drive voltage has been received, the operation continues to Step 260 in which the drive voltage is set to the received and/or obtained drive voltage. When no drive voltage has been received and/or obtained in Step 240, the operation continues to Step 245, in which the vibration control manager 110 determines whether any other information which can be used to determine the drive voltage is available. When no other information is available, the operation returns to Step 205 and periodically checks for a battery change. When other information is available in Step 245, the operation continues to Step 250 in which the vibration control manager 110 determines the drive voltage using the other information.

After Steps 230, 235, 250, and 260, the operation continues to Step 255 in which the vibrator 175 is driven using the new drive voltage as described previously herein for FIG. 1.

The operation of the present invention, as described herein provides a method for automatically adjusting motor vibration strength based on the detection of mass lost or gained when a battery or other accessory device (such as a speaker or a dongle) is attached or removed. It uses identification data to automatically adjust vibration strength.

The present invention provides a method and apparatus for compensating for changes in the weight and/or size of an attached battery and/or accessory within a portable electronic device. For example, when the radio vibration is optimized to the lightest battery pack or accessory, then any weight added by heavier battery packs or accessories reduces the vibration force. The present invention provides for increasing the drive voltage to the vibrator to compensate for vibration amplitude loss with only a slight decrease to the battery life. Similarly, when the radio vibration is optimized to the heaviest battery pack or accessory, then any weight loss by a lighter battery packs or accessories increases the vibration amplitude. The present invention provides for reducing the voltage to the vibrator to compensate for the lower weight with a slight increase in battery life.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. A method of operation of a portable electronic device comprising the steps of:

associating each of a plurality of drive voltages with at least one device identification;

detecting an attached device;

determining an identification for the attached device;

selecting a drive voltage from the plurality of drive voltages; and driving a vibrator using the drive voltage.

2. A method of operation as recited in claim 1, wherein the detecting step comprises detecting an attached battery.

3. A method of operation as recited in claim 1, wherein the detecting step comprises detecting an attached accessory.

4. A method of operation as recited in claim 1, wherein the determining step comprises the step of:

receiving the identification from the attached device.

5. A method of operation as recited in claim 1, wherein the determining step comprises the step of:

querying the attached device to obtain the identification.

6. A method of operation as recited in claim 1, wherein the associating step comprises the step of:

retrieving the drive voltage from a memory in which the identification and the drive voltage are stored.

7. A method of operation of a portable electronic device as recited in claim 1 wherein the associating step comprises the step of:

calculating the drive voltage from the identification.

8. A portable electronic device comprising:

an attached device;

a vibrator;

a memory that includes a plurality of drive voltage values that are each associated with at least one device identification and a processor coupled between the attached device and the vibrator, the processor adapted to:

detect the attached device, select a drive voltage from the plurality of drive voltage values, and drive the vibrator using the drive voltage.

9. A portable electronic device as recited in claim 8 wherein the attached device comprises an attached battery.

10. A portable electronic device as recited in claim 8, wherein the attached device comprises an attached accessory.

11. A portable electronic device as recited in claim 8, further comprising:

a power management block coupled between the processor and the vibrator for creating the drive voltage for the vibrator in response to a command from the processor.

12. A portable electronic device as recited in claim 8, further comprising a memory coupled to the processor for storing a plurality of identifications and associated drive voltages, wherein the processor is adapted to retrieve the drive voltage associated with the identification.

* * * * *